Oct. 31, 1939.  R. A. COLGIN  2,178,322
POWER TAKE-OFF
Filed Dec. 3, 1938  2 Sheets-Sheet 1
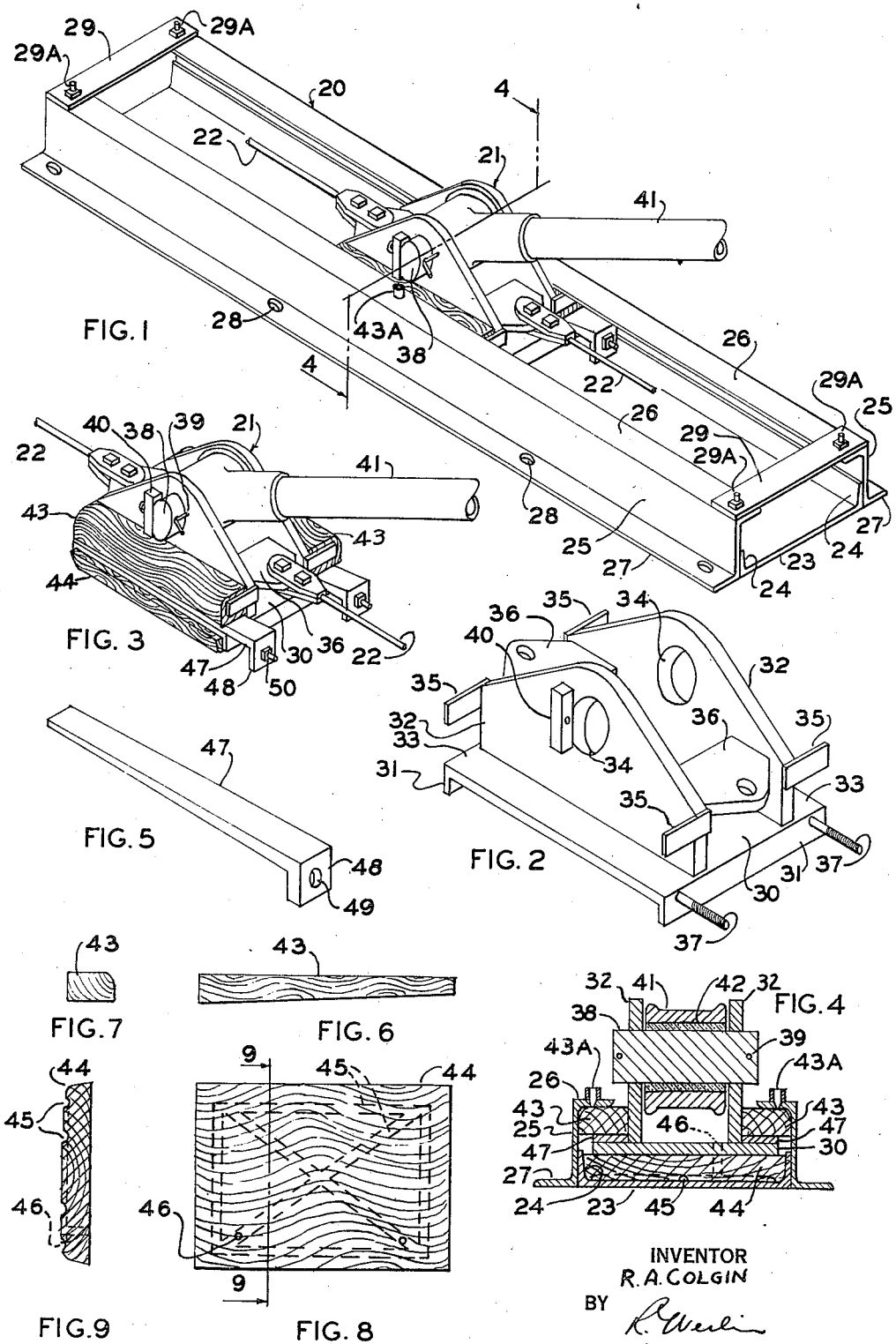
INVENTOR
R. A. COLGIN
BY
ATTORNEY Oct. 31, 1939.  R. A. COLGIN  2,178,322
POWER TAKE-OFF
Filed Dec. 3, 1938  2 Sheets-Sheet 2
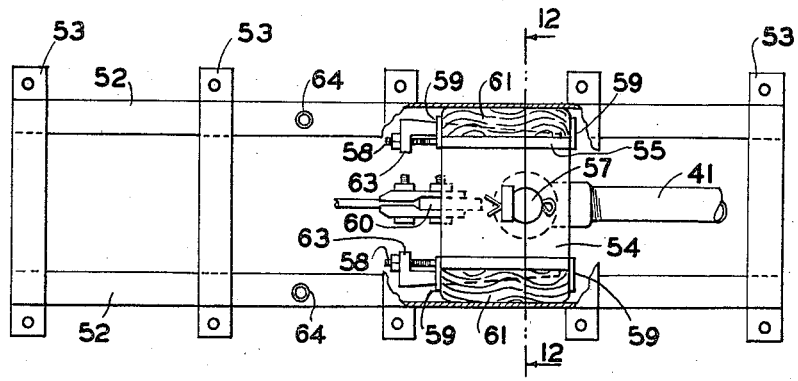
FIG. 10
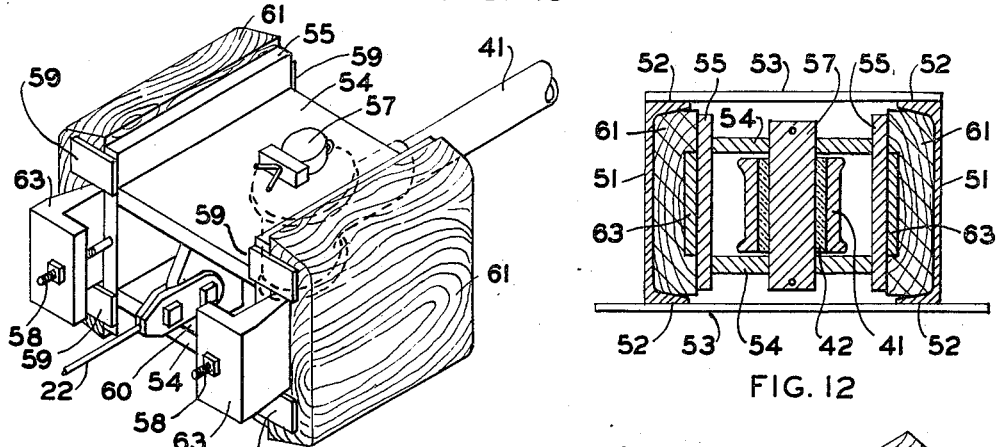
FIG. 11  FIG. 12
FIG. 14  FIG. 15
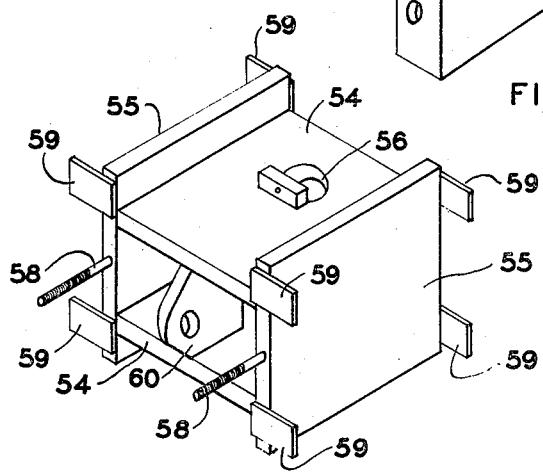
FIG. 13
INVENTOR
R. A. COLGIN
BY
ATTORNEY Patented Oct. 31, 1939

2,178,322

UNITED STATES PATENT OFFICE 2,178,322

POWER TAKE-OFF

Rufus A. Colgin, Tulsa, Okla., assignor to W. C. Norris Manufacturer, Incorporated, Tulsa, Okla., a corporation of Delaware Application December 3, 1938, Serial No. 243,819

5 Claims. (Cl. 308—3)

This invention relates to new and useful improvements in sliding cross head type power take-offs to rod lines for pumping wells, and particularly to novel sliding cross head constructions for use in such power take-offs.

A principal object of this invention is to provide sliding cross head type power take-offs for rod lines for pumping wells which are relatively simple in form and comparatively cheap to construct.

Another important object is to provide sliding cross head type power take-off units for rod lines for pumping wells, which are relatively simple in form and comparatively cheap to construct, and which combine excellent power efficiency with the functions of hold-down, hold-up and hold-over devices for holding rod lines in desirable alignment while being operated by the cross head.

Another object of the present invention is to provide in such power take-off units sliding cross heads having easily removable slide bearing members which may be easily replaced, and which are relatively long wearing and of low cost construction.

A more specific object is to provide in such power take-off units forms of sliding cross heads, the wearing surfaces of which comprise readily removable bearing members constructed of non-metallic materials.

Another specific object is to provide in such power take-off units sliding type cross heads whose bearing members comprise wood blocks.

A further object is to provide adjustable wear take-up means for the bearing members of the sliding cross heads of the power take-off units herein described.

Additional and more specific objects and advantages of this invention will become readily apparent from the following detailed description and the accompanying drawings which illustrate two modifications of sliding cross head type power take-off units in accordance with this invention.

In the drawings:

Fig. 1 is a view in perspective of a complete power take-off unit in accordance with this invention and wherein the cross head is adapted to be slidingly reciprocated from a power crank rotating in a vertical plane.

Fig. 2 is a view in perspective of the frame of the cross head of Fig. 1.

Fig. 3 is a view in perspective of the cross head assembly of Fig. 1 showing the removable bearing members and wear take-up gibs assembled on the cross head frame of Fig. 2.

Fig. 4 is a transverse cross-sectional view of the power take-off unit taken along line 4—4 of Fig. 1.

Fig. 5 is a detail of one of the gibs, and

Figs. 6, 7, 8 and 9 are views showing details of the cross head bearing members.

Fig. 10 is a plan view of another modification of power take-off unit wherein the cross head is adapted to be slidingly reciprocated by a crank rotating in a horizontal plane.

Fig. 11 is a view in perspective of the cross head assembly of Fig. 10.

Fig. 12 is a transverse sectional view taken along line 12—12 of Fig. 10.

Fig. 13 is a view in perspective of the frame of the cross head of Fig. 10.

Fig. 14 is a detail in perspective of one of the gibs employed in the cross head of Fig. 10, and Fig. 15 is a detail in perspective of one of the bearing members of the cros head of Fig. 10.

Referring to the drawings and to Figs. 1 to 9 in particular, there is shown a sliding cross head type power take-off unit consisting of a guide frame, designated generally by the numeral 20, and a cross head member, designated generally by the numeral 21, adapted to slidingly reciprocate longitudinally of guide frame 20 and alternately pull rod lines 22—22 coupled to opposite ends of the cross head and connected to well pumps, not shown.

Guide frame 20 (Figs. 1 and 4) consists of an elongated base member 23, formed preferably of channel iron, the web of which is horizontally positioned and having edge flanges 24—24 extending upwardly therefrom, and a pair of side members 25—25, preferably constructed of Z-bars, the webs of which are placed flush against the outer faces of the respective flanges 24—24 and fastened thereto, generally by welding. The Z-bars are so positioned that their upper flanges 26—26 extend inwardly toward each other and are spaced vertically from base member 23, thereby forming oppositely disposed channels above and along each of the longitudinal edges of the base member 23, the flanges 26—26 forming upper guide rails spaced from the base member of the guide frame. The lower flanges 27—27 of the Z-bars extend laterally outwardly from the base member 23 in horizontal alignment therewith and are provided with longitudinally spaced openings 28—28 to provide means for fastening the guide frame down on a suitable support such as concrete block, not shown. Tie bars 29—29 are removably connected by means of bolts 29a to the upper Z-bar flanges 26—26 at their opposite ends to hold the side members of the frame against spreading and to aid in the bracing of the completed structure.

It will be understood that standard structural shapes and sections other than channels and Z-bars may be used to make up a guide frame of the described form, or special shapes may be used for this purpose, which primarily is to provide a rectangular box-like guide frame, closed on its bottom and side surfaces and open at the top but provided with inwardly extending edge rails spaced vertically from the bottom of the frame.

Cross head 21 is formed of a frame comprising a base plate 30, which is positioned horizontally between side members 25—25 of the guide frame and is somewhat narrower than the space between the side members. The opposite ends of base plate 30 are provided with down-turned flanges 31—31 forming a recessed seat beneath the lower face of base plate 30. Rigidly mounted on the upper surface of base plate 30 and extending longitudinally thereof are a pair of upwardly extending, spaced parallel pillow blocks 32—32, each of which is also spaced inwardly from its respective adjacent edge of base plate 30, thereby providing a horizontal shoulder 33 along the outside of each of the pillow blocks. The upper edges of pillow blocks 32 are curved upwardly, thereby being made higher at their centers than at their ends. Registering openings 34—34 are provided in the curved portions of the pillow blocks to receive a wrist pin 38. A pair of lugs 35—35 extend laterally outwardly from the opposite ends of each of the pillow blocks above shoulders 33 and form end retainers for bearing members, to be later described, which are seated on shoulders 33. A pair of rod line attachment plates 36—36 are horizontally positioned between the pillow blocks at opposite ends thereof and are spaced vertically from the upper surface of base plate 30. The attachment plates 36—36 are each rigidly attached along their side edges to the adjacent inner faces of pillow blocks 32—32 to prevent dislodgment therefrom and to provide lateral bracing for the pillow blocks. A pair of horizontally spaced rods 37—37 are rigidly attached to one end of base plate 30 and extend longitudinally therefrom, and are threaded on their free ends.

A wrist pin 38 extends through openings 34—34 and is pinned against rotation relative thereto by means of a cotter key 39 which extends through suitable registering openings in one end of the wrist pin and in a lug 40 rigidly attached to the outer face of one of the pillow blocks 32 and adjacent to its opening 34. A connecting rod or pitman 41 is journalled at one end to oscillate on wrist pin 38, a wrist pin bearing 42 being interposed between the pitman connection and the wrist pin. The opposite end of pitman 41 is connected to a conventional eccentric crank or wheel, not shown, which is rotated in a vertical plane by a conventional prime mover, not shown, for the purpose of imparting a reciprocating movement to the cross head 21 within guide frame 20 for alternately pulling the rod lines 22—22 and pumping their connected wells, not shown.

To provide bearing surfaces between the cross head frame and the top, bottom and side members of the guide frame 20 in order to permit smooth and relatively frictionless reciprocation of the cross head in the guide frame, a bearing block 43 is seated on each of the shoulders 33 between the respective retaining lugs 35—35, and another bearing block 44 is seated in the recess between the end flanges 31—31 beneath the lower face of base plate 30. The bearing blocks 43 are of such size and shape as to fit snugly in the spaces between shoulders 33 and the angles formed by the webs and the upper flanges 26 of the side members 25, when bearing block 44 is in place and the cross head completely assembled. Bearing block 44 is of a size and shape to fit snugly in the recess between end flanges 31—31, and its outer surfaces, including its lower face and side edges are shaped to conform snugly to the shape of the inner surface of base member 23 of the guide frame. The lower face of bearing block 44 is preferably provided with oil grooves 45 which communicate with the upper face of base plate 30 through a pair of oil passageways 46 (Figs. 4, 8 and 9). Thus, lubricating oil or grease may be fed to the lower face of bearing block 44 from the upper side of base plate 30. Similarly, oiler fittings 43a are provided in flanges 26—26 for supplying lubrication to bearing blocks 43.

The faces of bearing blocks 43 which are adjacent to shoulders 33 are sloped from end to end and a pair of tapered gibs 47—47 are inserted between the blocks 43 and their respective shoulders 33. Each of gibs 47 is provided at one end with a down-turned flange 48 which is perforated at 49 to receive the threaded end of one of the rods 37. The gibs are adjustable longitudinally along shoulders 33 to take up the wear on the bearing blocks and are held in the desired take-up position by means of thrust nuts 50 which are screwed down on rods 37 against the flanged ends 48 of the gibs.

As will be seen in the drawings, bearing blocks 43 are wider than shoulders 33 and thus, when in place, project beyond the side edges of the shoulders. Similarly, bearing block 44 is wider than base plate 30.

As a result, when the cross head is assembled within the guide frame 20, no part of the cross head frame will be in contact with the guide frame, and all bearing contact will be applied to bearing blocks 43 and 44 when the cross head is reciprocated in the guide frame.

Bearing blocks 43 and 44 are preferably constructed of wood, particularly hard wood, as it is found that such material, particularly when kept lubricated with oil or grease, provides excellent anti-friction bearings which do not wear rapidly, and which are especially advantageous in power take-off units of the class described which commonly are required to operate under dirty or sandy conditions general in oil fields. Also, the replacement cost, when such wood bearings have become worn excessively, is comparatively low, and as they can easily be constructed in the field, replacements are thus easily and quickly made available.

It will be further noted that bearing blocks 43 and 44 are held against lateral displacement from the cross head frame solely by their contact with side members 25 and base member 23. Thus, replacement of these bearing blocks, when they become worn, is greatly simplified, as it is only necessary to unbolt and remove one of the tie bars 29 from the guide frame, withdraw the cross head from the thus opened end of the frame, lift the worn blocks from their respective seats in the cross head frame, and replace them with new bearing blocks.

Figs. 10 to 15, inclusive, illustrate another modification of a sliding cross head type of power take-off unit which is adapted particularly for operation with power cranks or wheels rotating in a horizontal plane, such as the conventional band wheel powers and the like. In this modification, the parts of the cross head, equivalent to those in the former modification, are positioned generally at a right angle to their former positions in the previously described modification. The shape of the guide frame and the parts of the cross head being altered somewhat to accord with the new position.

In this modification, the guide frame includes side members 51—51, preferably constructed of elongated channels set on edge and spaced apart horizontally with their flanges 52—52 turned inwardly toward each other. The side members are firmly tied together and braced by means of a plurality of spaced tie bars 53—53 extending between the opposing upper and lower flanges 52—52. The lower tie bars extend laterally beyond the side members 51 and are provided with perforations for attachment of the frame to a support block, not shown.

The cross head frame is formed from a pair of spaced rectangular pillow blocks 54—54, horizontally positioned between the side members 51—51. A pair of side plates 55—55 are vertically positioned and rigidly connected to the opposite side edges of the pillow blocks. Registering openings 56 are provided in the pillow blocks near one end thereof and centrally between the side plates for receiving a wrist pin 57 which extends vertically through the pillow blocks and is keyed against rotation and lateral movement relative thereto by means of a cotter key and lug construction similar to that in the previously described modification. Extending from adjacent ends of each of the side plates 55 are threaded rods 58, which are positioned intermediate the top and bottom edges of the side plates. Pairs of retainer lugs 59—59 extend laterally outwardly from each end of each of the side plates 55 and the lugs of each pair of lugs 59 are spaced apart vertically along their respective end of a side plate. The horizontal distance between the outer ends of each pair of oppositely disposed lugs is less than the distance between the side members 51, while the width of side plates 55 from top to bottom is less than the distance between the top and bottom flanges 52—52 of the side members. A rod line coupling attachment plate 60 is positioned vertically between the pillow blocks 54—54 at the end thereof opposite that near which the wrist pin openings 56 are located, and intermediate the side plates 55—55. A pitman 41 is journalled, as before on wrist pin 57 about a bearing 42, but since the cross head structure is now positioned at right angles to the position assumed in the former modification, the pitman will oscillate in a horizontal plane in reciprocating the cross head, rather than in the vertical plane of the previously described power take-off unit.

A pair of rectangularly shaped bearing blocks 61—61, shaped on their top and bottom edges and their outer faces to conform with the shape of the channels in the side members 51—51, are positioned against the outer faces of side plates 55—55 between the retainer lugs 59, the inner faces of the bearing blocks 61 being substantially flat to lie flush against the side plates. The width of bearing blocks 61 is greater than that of the side plates and project beyond the top and bottom edges thereof sufficient to fit snugly in the channels of the side members 51 between the flanges 52—52. The thickness of the bearing block 61 is sufficient to snugly fill the space between the outer faces of side plates 55 and the adjacent faces of the webs of the side members 51. The inner faces of each of the bearing blocks 61 is provided with a rectangular recess 62, which tapers from one end to the other to accommodate gibs 63, which are adjustable longitudinally in the recesses between the outer faces of plates 55 and their adjacent bearing blocks 61 to take up wear of the bearing blocks. As in the former modification, the gibs 63 are provided with perforated flanges for receiving rods 58 on which the gibs are adjustably fixed by suitable thrust nuts threaded on the ends of the rods.

In operation the bearing blocks 61 bear against the inner faces of the webs and top and bottom flanges of the side members 51 and provide cheap and simply constructed anti-friction bearings for the cross head. Lubrication for the bearings is provided by means of oiler fittings 64 connected to the upper flanges 52 of the side members. If desired, the outer faces of the bearing blocks may be grooved for better distribution of the lubricating medium supplied through fittings 64.

As in the former modification, the bearing blocks 61 are preferably constructed of hardwood for the reasons previously enumerated. However, in both modifications, anti-friction metal, or non-metallic material may be employed to advantage in many cases in the construction of the bearing blocks. Also as in the former modification, the bearing blocks are held against lateral displacement from the cross head frame solely by their contact with side members 51, and are simply and easily replaced merely by withdrawing the cross head from one end of the guide frame and substituting new bearing blocks for the old which are removable from the cross head frame simply by lifting them from their seats.

In operation, both modifications have many advantages over more conventional types of power take-off units. By employing the sliding cross head principle, the units herein described combine the advantages of efficient power take-off means together with the functions of the conventional hold-down, hold-up and hold-over devices commonly employed in operating pull rods to wells, since the form and arrangement of the guide frames serve to limit the vertical and lateral movement of the cross heads during their longitudinal reciprocation and to thereby limit the corresponding movements of the rod lines attached thereto.

Numerous other modifications and alterations may be made in the size, form and arrangement of parts of the described invention without departing from the scope of the appended claims.

What I claim and desire to secure by Letters Patent is:

1. A power take-off to rod lines for pumping wells comprising, an elongated guide frame substantially rectangular in cross-section closed along the bottom and sides thereof and having inwardly turned flanges along the upper longitudinal edges of said sides, a cross head member adapted to be slidingly reciprocated longitudinally within said guide frame, a flat-surfaced bearing member disposed in the lower face of said cross head member and in sliding contact with the bottom of said guide frame, a pair of flat-surfaced bearing members disposed on the upper face of said cross head member along opposite side edges thereof and each in sliding contact with the adjacent angular surface formed by the junction of one of said inwardly turned flanges with its adjacent side of said guide frame, said bearing members being held in the cross head member against outward lateral displacement therefrom solely by their bearing contact with the adjacent faces of said guide frame, a power connection means having one end journalled in said cross head member between said pair of bearing members for reciprocating the cross head member, and means for connecting said cross head member to rod lines for pumping wells.

2. A power take-off to rod lines for pumping wells comprising, an elongated guide frame consisting of a pair of channels spaced apart with their edge flanges turned inwardly toward each other, a cross head member adapted to slidingly reciprocate longitudinally between said channels, bearing members disposed on opposite sides of said cross head member and in sliding contact with the inner surfaces of said channels, said bearing members being held in the cross head member against outward lateral displacement therefrom solely by their bearing contact with the adjacent faces of said guide frame, gibs on opposite sides of said cross head member and adjustable longitudinally between said bearing members and the adjacent side faces of said cross head member, a power connection means journalled in said cross head member for reciprocating same, and means for connecting said cross head member to rod lines for pumping wells.

3. A power take-off to rod lines for pumping wells comprising, an elongated guide frame substantially rectangular in cross-section, closed along the bottom and sides thereof and having inwardly turned flanges along the upper longitudinal edges of said side members, a cross head member adapted to slidingly reciprocate longitudinally within the guide frame, a plurality of bearing members removably mounted on the cross head in sliding contact with adjacent faces of the guide frame, said bearing members being held in the cross head against outward lateral displacement therefrom solely by their bearing contact with the adjacent faces of the guide frame, power connection means for reciprocating the cross head member and means for connecting said cross head member to rod lines for pumping wells.

4. A power take-off to rod lines for pumping wells comprising, an elongated guide frame substantially rectangular in cross-section closed along the bottom and sides thereof and having inwardly turned flanges along the upper longitudinal edges of said sides, a cross head member adapted to be slidingly reciprocated longitudinally within said guide frame, a pair of flat-surfaced bearing members disposed on the upper face of said cross head member along opposite side edges thereof and each in sliding contact with the adjacent angular surface formed by the junction of one of said inwardly turned flanges with its adjacent side of said guide frame, said bearing members being held in the cross head member against outward lateral displacement therefrom solely by their bearing contact with the adjacent faces of said guide frame, a power connection means for reciprocating the cross head member, and means for connecting said cross head member to rod lines for pumping wells.

5. A power take-off to rod lines for pumping wells comprising, an elongated guide frame substantially rectangular in cross-section closed along the bottom and sides thereof and having inwardly turned flanges along the upper longitudinal edges of said sides, a cross head member adapted to be slidingly reciprocated longitudinally within said guide frame, a wooden flat-surfaced bearing member disposed in the lower face of said cross head member and in sliding contact with the bottom of said guide frame, a pair of wooden flat-surfaced bearing members disposed on the upper face of said cross head member along opposite side edges thereof and each in sliding contact with the adjacent angular surface formed by the junction of one of said inwardly turned flanges with its adjacent side of said guide frame, said bearing members being held in the cross head member against outward lateral displacement therefrom solely by their bearing contact with the adjacent faces of said guide frame, a power connection means having one end journalled in said cross head member between said pair of bearing members for reciprocating the cross head member, and means for connecting said cross head member to rod lines for pumping wells.

RUFUS A. COLGIN.